Patented Nov. 12, 1935

2,020,356

UNITED STATES PATENT OFFICE 2,020,356

PROCESS FOR THE MANUFACTURE OF DICARBOXYLIC ACID ESTERS

Charles W. Hawley, New Brunswick, N. J., assignor to E. I. du Pont de Nemours & Company, Wilmington, Del., a corporation of Delaware No Drawing. Application March 16, 1934, Serial No. 715,991

6 Claims. (Cl. 260—103)

This invention relates to a method for the condensation of organic compounds and more particularly to a process for the removal of the water of such condensation from the zone of reaction, in condensations where polycarboxylic acid anhydrides and alcoholic bodies are the reacting ingredients.

It is necessary in all condensing reactions that the water of condensation be removed from the reaction mixture, otherwise the reaction being reversible, only small yields of the desired condensation product will be obtained. The methods ordinarily practiced for removing this water of condensation include the use of a water absorbing material or a non-reacting volatile liquid. Thus, sulphuric acid, or an anhydrous water absorbing salt, may be added to the reaction mixture to absorb the water as it is formed. Or when a non-reacting volatile liquid, such as benzol, is added to the reacting bodies and the liquid evaporated in the presence of water and an alcoholic body, an azeotropic mixture is formed which in leaving the zone of reaction carried with it the water of condensation.

This invention has as an object an improved process for the removal of the water of condensation without the use or addition of any water-removing substances which do not of themselves enter into the reaction. It has as a further object the lowering of the temperature of reaction, and the shortening of the cycle of operation. Other objects will appear hereinafter.

These objects are accomplished by the following invention which in its preferred embodiment consists in reacting a polycarboxylic anhydride with alcoholic body in amount less than required for complete esterification, and employing the same or a different alcoholic body in vapor phase to complete the reaction and sweep the water of condensation out of the reaction mixture.

In the manufacture of simple esters where the alcoholic body introduced in the second stage is the same as that used in the first stage, I prefer to proceed as follows:

A di-carboxylic acid, is placed in a reaction vessel, together with approximately one-half of the total theoretical quantity of alcoholic body required for complete condensation, or esterification of the acid. This mixture is then heated to a temperature of at least 5° C. above the boiling point of the particular alcoholic body used in the condensation reaction, and carefully maintained at this temperature. A small stream of the particular alcoholic body is then passed into the reaction vessel beneath the surface of the reaction mixture. A part of the liquid alcohol reacts with the mono ester and the remainder immediately flashes to the vapor phase because of the higher temperature of the reaction mixture, and a considerable portion of it, in passing through and out of the reaction mixture, carries the water of condensation out of the zone of reaction.

In order to obtain a high speed of condensation, it is preferred to use a small quantity of a catalytic body of the kind well known to promote the speed of esterifying reactions. Sulphuric acid is preferred, but many other materials are known to have the property of speeding the rate of reaction.

The vapors of the particular alcoholic body which have been used to sweep out of the water of condensation may be conveniently recovered and used in other processes wherein a small water content is not harmful, or they may be rectified in order to remove the water, and returned to the reaction vessel.

Instead of introducing the alcohol in liquid form as described above, the process may also be carried out by allowing a small flow of the vapor phase of the particular alcoholic body to pass beneath the surface of the original reaction mixture, (consisting as described above of the polycarboxylic acid or anhydride and approximately one-half of the total theoretical proportion of the alcoholic body to be condensed) which is maintained at a temperature of at least 5° C. above the boiling point of the particular alcoholic body. A considerable portion of this vapor phase of the alcoholic body, upon coming in contact with the reaction mixture which is maintained at a temperature above the boiling point of the particular alcoholic body, in passing through and out of the reaction mixture, carried the water of condensation out of the zone of reaction.

If the process is used to make mixed esters where the alcoholic body passed into the reaction mixture in fluid phase is different from the alcoholic body or bodies with which the anhydride is partially esterified, and which constitute the reaction mixture, the temperature of the reaction mixture is determined by the alcohol passed through in vapor phase. This temperature, as indicated above, in such that the introduced alcohol will pass through the reaction mixture in vapor phase.

As an example of the condensation of phthalic anhydride and the mono-methyl ether of ethylene glycol, I use the following procedure:

296 pounds of phthalic anhydride are placed in a reaction vessel, and 150 pounds of ethylene-glycol-mono-methyl ether are added. The mixture is heated to about 105° C. and held there until the anhydride is dissolved. Approximately 13 pounds of catalyst (sulphuric acid) are dissolved in 35 pounds of ethylene-glycol-mono-methyl ether, and this mixture is then put into the reaction vessel. The contents of the reaction vessel are then heated to a temperature of 130° to 135° C. Liquid ethylene-glycol-mono-methyl ether is then fed beneath the surface of the reaction mixture which is carefully maintained at a temperature of 130° to 135° C. The rate of feeding for a charge of this size is approximately 75 pounds of ethylene-glycol-mono-methyl ether per hour, and the feeding is continued until the phthalic anhydride is all combined. This will require that approximately 314 pounds of ethylene-glycol-mono-methyl ether be fed. Since the ethylene-glycol, mono-methyl ether is fed beneath the surface of a reaction mixture which is above the boiling point of the ethylene-glycol-mono-methyl ether, the latter alcoholic body immediately flashes to the vapor phase, and a considerable portion of it, in passing through and out of the zone of reaction, carries with it the water of condensation.

As soon as the entire quantity of ethylene-glycol-mono-methyl ether has been fed, the condensing reaction is considered complete, and the condensation product remaining in the reaction vessel is washed with a sodium carbonate solution to remove the small amount of catalyst, and any small traces of uncombined mono-acid ester.

Instead of producing the vapor phase of the ethylene-glycol-mono-methyl ether by flashing within the reaction mixture, as described in the above example, one can also introduce the vapor phase directly into the reaction mixture in the same quantities and at the same rate as described above.

The process as above described in the foregoing example usually gives a yield of condensation product in excess of 91% of the theoretical.

The minimum amount of alcohol added in the initial stage of my process should correspond to that amount necessary to form the mono acid ester. Thus, in the case where a dicarboxylic acid is used, approximately one-half of the total theoretical quantity of alcohol is required. For a tricarboxylic acid, about one-third of the total theoretical quantity is added. Substantially greater amounts may, of course, be added, but there is no object in doing this since the excess would be merely driven off when elevated temperatures are applied during the second stage of the process.

Actually in practice the amount of alcohol added in excess of that required to form the mono acid ester is that amount which is required to obtain a boiling point corresponding to the desired temperature of the reaction. The optimum temperature will depend upon the reacting ingredients, amount of catalyst, time, and yield desired as indicated by the following runs for di-butyl phthalate in which the catalyst is sulfuric acid:

| Run | Temperature | Catalyst | Time | Yield | Pressure m.m. Hg |
|---|---|---|---|---|---|
|  | °C. | Percent | Hours |  |  |
| 1 | 120 | .5 | 8 | 88.7 | 150-200 |
| 2 | 125 | .4 | 12 | 91.5 | 150-200 |
| 3 | 125 | .4 | 12 | 93.9 | 150-200 |
| 4 | 125 | .4 | 10 | 95.6 | 150-200 |
| 5 | 125 | .5 | 9 | 95.6 | 150-200 |
| 6 | 125 | .67 | 12 | 91.7 | 150-200 |
| 7 | 125 | .67 | 10 | 93.3 | 150-200 |
| 8 | 125 | .67 | 8 | 90.8 | 150-200 |
| 9 | 140 | .5 | 7.75 | 93.7 | 150-200 |
| 10 | 125 | .04 | 33 | 90.0 | Atmos. |

From this data the optimum conditions appear to be about as follows: temperature 125°–135° C., catalyst 0.5%, pressure 150–200 mm. of mercury.

In esters of this type reduced pressure is usually advantageous since as in the case of dibutyl phthalate the reaction time at atmospheric pressure is from 2 to 4 times that at 150–200 mm. of mercury.

The invention described above is most advantageously carried out with anhydrides of polycarboxylic acids, such as phthalic anhydride, trimellitic anhydride, and mellophanic anhydride. The corresponding acids may, however, be used.

My process is of particular value in the condensation of polycarboxylic acids which form anhydrides with alcohol bodies as widely divergent in properties as methyl alcohol and cyclohexanol for the production of esters such as dimethyl phthalate, diethyl phthalate, dibutyl phthalate, dimethyl cellosolve phthalate, dicyclohexyl phthalate, etc. Methyl, ethyl, propyl, butyl, and amyl alcohols, methyl, ethyl, propyl and butyl ethers of ethylene-glycol, and cyclohexanol, may be readily condensed with dicarboxylic acid anhydrides by this process. Mixed esters, as for example methyl ethyl phthalate, are made by initially reacting one of the kind of alcohols just named with the anhydride and introducing a different one of these alcohols in the vapor or liquid phase in the second stage of the reaction. Generally, the alcohols useful in the practice of my invention are those having a boiling point not higher than 200° C. which includes polyhydric alcohols of low boiling point such as ethylene-glycol.

In the practice of my invention the polycarboxylic anhydrides are preferred rather than the corresponding polycarboxylic acids because in the case of the anhydride the formation of the mono acid ester will readily proceed without the use of a catalyst. If the acid is substituted for the anhydride the reaction goes forward at a very much reduced rate and a catalyst must be used. Greater decomposition occurs with resultant formation of undesirable color and odor. Hence, if a dicarboxylic acid not in the anhydride form is condensed by my process with an alcoholic body, the high yields resulting from the use of the anhydride are not obtained because of losses sustained during the necessarily longer processing period and because of the decomposition products that are formed. Polycarboxylic acids which do not form anhydrides are still less desirable because of low yield and for the reasons just mentioned. These acids are not, therefore, comprehended by the present invention. The advantages of my process are also not obtained with monocarboxylic acids which in general are incapable of forming anhydrides.

The efficiency of my process and the high yields obtained may perhaps be explained as follows: The condensation of an anhydride of dicarboxylic acid with one-half of the theoretical quantity of an alcoholic body required for complete condensation takes place readily upon contact of the two reacting ingredients without the aid of a catalyst. One molecule of water having been removed during the formation of the anhydride from the dicarboxylic acid, the one molecule of alcohol can combine without the necessity of removing any water of condensation from the reaction mixture, since there is no water of condensation formed.

This compound forms the "reaction mixture" just indicated, and because it is a definite compound with a low vapor pressure, and not a simple mixture of dicarboxylic acid anhydride and alcoholic body, it permits the vapor phase of the alcoholic body to pass through it, a portion combining and separating water of condensation, and a portion sweeping through and carrying with it this water of condensation.

Over the well known prior art method of removing water of condensation, i. e., the use of relatively large amounts of sulphuric acid as a water-absorbing medium, this process has many advantages, as follows:

(a) The formation of unsaturated compounds from the action of the strong sulphuric acid is avoided. In cases where secondary or tertiary alcohols are to be condensed, for example, the action of strong sulphuric acid is especially disadvantageous. Large quantities of unsaturated gases are produced causing loss in yield and unpleasant odors in the final product.

(b) Since in this process, no substance is employed as a water-removing material which is not an ingredient of the condensation, the presence of such foreign substances in the finished product is avoided. It also avoids other disadvantages which arise in the use of an inert carrier, such as losses, necessity for storage tanks, etc.

(c) When this process is employed, the finished product is better as to color and odor than that obtained by any method hitherto used. This is probably because of the gentle treatment and low temperatures permitted, no water carrier being present and the time of exposure to the catalyst (H₂SO₄) being shorter.

(d) Because of the extremely short cycle of operation, relatively small equipment can produce large quantities of condensation product. This, of course, is promptly reflected in the cost of the finished product. Labor and equipment costs are lowered. A saving of approximately 16% of the total cost in the manufacture of the condensation product of phthalic anhydride and ethylene-glycol-mono-ethyl ether has been effected, due entirely to this process.

As many apparently widely different embodiments of this invention may be made without departing from the spirit and scope thereof, it is to be understood that I do not limit myself to the specific embodiments thereof except as defined in the following claims:

I claim:

1. A process for condensing organic compounds and alcohols which comprises reacting an acid substance of the class consisting of polycarboxylic acids capable of forming anhydrides and anhydrides of polycarboxylic acids with an alcohol in an amount less than required to completely esterify said substance, passing a stream of alcohol into the reaction mixture, maintaining the temperature of the reaction mixture above the boiling point of said last mentioned alcohol, and thereby completing the condensation and carrying the water of condensation out of the zone of reaction by the passage of a stream of said alcohol in vapor phase through the reaction mixture.

2. A process for condensing organic compounds and alcohols which comprises reacting an acid anhydride of a polycarboxylic acid with an alcohol in an amount less than required to completely esterify the anhydride, passing a stream of alcohol into the reaction mixture, maintaining the temperature of the reaction mixture above the boiling point of said last mentioned alcohol, and thereby completing the condensation and carrying the water of condensation out of the zone of reaction by the passage of a stream of said alcohol in vapor phase through the reaction mixture.

3. A process for condensing organic compounds and alcohols which comprises reacting an anhydride of a polycarboxylic acid with an alcohol which boils not higher than 200° C. and which is present in an amount less than required to completely esterify the polycarboxylic acid, and passing a stream of alcohol, boiling not higher than 200° C. into the reaction mixture, maintaining the temperature of the reaction mixture above the boiling point of said last mentioned alcohol, and thereby completing the condensation and carrying the water of condensation out of the zone of reaction by the passage of a stream of said alcohol in vapor phase through the reaction mixture.

4. A process for condensing organic compounds and alcohols which comprises reacting an anhydride of a polycarboxylic acid with an alcohol which boils not higher than 200° C. and which is present in an amount less than required to completely esterify the polycarboxylic acid, and passing a stream of alcohol, boiling not higher than 200° C. into the reaction mixture, maintaining the temperature of the reaction mixture above the boiling point of said last mentioned alcohol, and thereby completing the condensation and carrying the water of condensation out of the zone of reaction by the passage of a stream of said alcohol in vapor phase through the reaction mixture.

5. A process for condensing organic compounds and alcohols which comprises reacting dicarboxylic acid anhydride with an alcohol boiling not higher than 200° C. in an amount less than required to completely esterify the anhydride, and passing a stream of the alcohol into the reaction mixture, maintaining the temperature of the reaction mixture above the boiling point of said last mentioned alcohol, and thereby completing the condensation and carrying the water of condensation out of the zone of reaction by the passage of a stream of said alcohol in vapor phase through the reaction mixture.

6. The method set forth in claim 5 in which the dicarboxylic acid anhydride is phthalic anhydride.

CHARLES W. HAWLEY.